United States Patent
Li et al.

(10) Patent No.: US 11,868,288 B2
(45) Date of Patent: Jan. 9, 2024

(54) VERIFICATION SYSTEM AND VERIFICATION METHOD FOR ETHERNET INTERFACE CHIP

(71) Applicant: SUZHOU CENTEC COMMUNICATIONS CO., LTD., Jiangsu (CN)

(72) Inventors: Yuanhan Li, Jiangsu (CN); Dong Wang, Jiangsu (CN); Chunjian Yuan, Jiangsu (CN); Mingda Zhang, Jiangsu (CN)

(73) Assignee: SUZHOU CENTEC COMMUNICATIONS CO., LTD., Jiangsu (CN)

( * ) Notice: Subject to any disclaimer, the term of this patent is extended or adjusted under 35 U.S.C. 154(b) by 23 days.

(21) Appl. No.: 17/775,310

(22) PCT Filed: Oct. 23, 2020

(86) PCT No.: PCT/CN2020/123087
§ 371 (c)(1),
(2) Date: May 8, 2022

(87) PCT Pub. No.: WO2021/109748
PCT Pub. Date: Jun. 10, 2021

(65) Prior Publication Data
US 2022/0374371 A1    Nov. 24, 2022

(30) Foreign Application Priority Data
Dec. 6, 2019 (CN) .......................... 201911242145.1

(51) Int. Cl.
G06F 13/16 (2006.01)
G06F 13/42 (2006.01)
H04L 47/10 (2022.01)

(52) U.S. Cl.
CPC ...... *G06F 13/1673* (2013.01); *G06F 13/4291* (2013.01)

(58) Field of Classification Search
CPC ... G06F 13/4291; G06F 13/1673; H04L 47/10
See application file for complete search history.

(56) References Cited

U.S. PATENT DOCUMENTS

| | | | |
|---|---|---|---|
| 2007/0211750 A1* | 9/2007 | Li | H04L 12/4625 370/445 |
| 2015/0341277 A1* | 11/2015 | Gravel | H04L 1/0041 370/468 |

(Continued)

FOREIGN PATENT DOCUMENTS

| | | |
|---|---|---|
| CN | 101436955 A | 5/2009 |
| CN | 10428602 A | 11/2019 |
| CN | 110995625 A | 4/2020 |

OTHER PUBLICATIONS

International Search Report for corresponding application PCT/CN2020/123087 filed Oct. 23, 2020; dated Jan. 11, 2021.

(Continued)

*Primary Examiner* — David E Martinez
(74) *Attorney, Agent, or Firm* — Gang Yu

(57) ABSTRACT

Provided is a verification system and a verification method for an Ethernet interface chip. The verification system comprises a Reconciliation Sublayer (RS), a Physical Coding Sublayer (PCS), a Physical Medium Attachment (PMA) layer, and a flow control unit connecting the RS and the PMA layer, wherein the PMA layer is provided with a PMA clock and a buffer, the buffer is configured to store data transferred from the PCS, and the PMA clock is configured to control the PMA layer to send the data in the buffer to an Ethernet interface chip to be tested.

20 Claims, 1 Drawing Sheet

(56) References Cited

U.S. PATENT DOCUMENTS

| | | | |
|---|---|---|---|
| 2015/0381312 A1 | 12/2015 | Basso et al. | |
| 2015/0381316 A1* | 12/2015 | Basso | H04L 47/19 |
| | | | 714/776 |
| 2016/0013922 A1* | 1/2016 | Su | H04L 12/4633 |
| | | | 370/436 |
| 2019/0319730 A1* | 10/2019 | Webb | H04L 12/40169 |

OTHER PUBLICATIONS

Wu, Yun. "The Design and UVM Verification of Ethernet Based Physical Media Additional Layer Interface Chip". Master's Dissertation of Hunan University. Jul. 15, 2020 (Jul. 15, 2020).

* cited by examiner

VERIFICATION SYSTEM AND VERIFICATION METHOD FOR ETHERNET INTERFACE CHIP

CROSS REFERENCE

This application is a National Stage Filing of the PCT International Application No. PCT/CN2020/123087 filed on Oct. 23, 2020, which claims priority to Chinese Applicant No. 201911242145.1 filed on Dec. 6, 2019, the entirety of which is herein incorporated by reference.

TECHNICAL FIELD

The present disclosure relates to the technical field of network communications, and in particular, to a verification system and a verification method for an Ethernet interface chip.

BACKGROUND

An Ethernet interface is a very important constituent part of a switch, and the verification of an Ethernet interface chip naturally becomes a key point for a switch.

A conventional verification system for an Ethernet interface chip comprises a Reconciliation Sublayer (RS), a Physical Coding Sublayer (PCS) and a Physical Medium Attachment (PMA) layer. The RS functions to make different medium types transparent to an upper layer (e.g., a Media Access Control (MAC) sublayer). The PCS functions to implement line encoding and Cyclic Redundancy Check (CRC). The PMA layer functions to implement serialization and de-serialization, and is connected to a high-speed serial interface (e.g., a serdes). After the RS receives a test message, the PCS encodes the test message, the PMA layer serializes the encoded message, and the serdes sends bit stream data to an Ethernet interface chip for testing.

During data transfer, the RS uses one clock to drive sending of data, and the PMA uses another clock to send data to the serdes. The number of bits transferred by the RS and the number of bits transferred by the PCS are usually in an integer multiple relationship, and therefore the two clocks are also in a multiple relationship, and can share the clock of the RS. While in the PCS, for a rate of 10 G or more, 64-bit to 66-bit encoding or other possible encodings will be performed, which causes the rate in the PMA layer to be slightly higher than the rates in the RS and the PCS. This results in that the clocks of the PMA layer and the RS are not in an integer multiple relationship, and two clocks having a precise ratio therebetween cannot be obtained in the case where both clocks take integer values. In cases where the two clocks cannot take accurate values, when data is transferred from the PMA layer to the serdes, the situations in which data is insufficient or data is excessive and has to be discarded may occur. For example, if the clock of the PMA layer is set to be slow, the intermediate data will be insufficient; and if the clock of the PMA layer is set to be fast, data has to be discarded. Certainly, a First in First Out (FIFO) may also be provided for buffering the data, but as data buffered in this case will accumulate and become more and more in volume, the required memory of the FIFO needs to be very large. In addition, even if the FIFO is very large, data may also be discarded due to indefinite growth of buffer.

SUMMARY

Some embodiments of the present disclosure provide a verification system and a verification method for an Ethernet interface chip.

Some embodiments of the present disclosure provide a verification system for an Ethernet interface chip, wherein the verification system comprises an RS, a PCS, a PMA layer, and a flow control unit connecting the RS and the PMA layer.

The PMA layer is provided with a PMA clock and a buffer, wherein the buffer is configured to store data transferred from the PCS, and the PMA clock is configured to control the PMA layer to send the data in the buffer to an Ethernet interface chip to be tested.

The flow control unit is configured to control sending of data in the RS based on determination concerning whether an amount of the data in the buffer is sufficient.

The RS is configured to send data to the PCS under control of the flow control unit.

The PCS is configured to send the data sent by the RS to the PMA layer.

As a further improvement of some embodiments of the present disclosure, the flow control unit is further configured to send a request to the RS in a case of determining that the amount of the data in the buffer is insufficient.

The RS is further configured to send data to the PCS after receiving the request from the flow control unit.

As a further improvement of some embodiments of the present disclosure, the flow control unit is further configured to:

set a data amount threshold of the buffer according to an outgoing transmission rate of the verification system, selection of the PMA clock, and a time interval between the flow control unit sending the request to the RS and the PMA layer receiving the data; and determine that the amount of the data in the buffer of the PMA layer is insufficient in a case of detecting that the amount of the data in the buffer is less than the data amount threshold.

As a further improvement of some embodiments of the present disclosure, the PCS comprises multiple pcs lanes, each pcs lane being provided with a FIFO, wherein data in each pcs lane is split into separate bits which are sent to corresponding FIFOs, and the FIFOs send the separate bits to the PMA layer.

Some embodiments of the present disclosure provide a verification method for an Ethernet interface chip, wherein the method verifies the Ethernet interface chip by using the verification system according to any one above, and the method comprises:

determining, by the flow control unit, that an amount of data in the buffer of the PMA layer is insufficient, and sending a request to the RS;

after receiving the request from the flow control unit, sending, by the RS, data received from an exterior of the verification system to the PCS;

sending, by the PCS, the received data to the PMA layer; and storing, by the PMA layer, the received data in the buffer, and sending, by the PMA layer under control of the PMA clock, the data in the buffer to the Ethernet interface chip to be tested.

As a further improvement of some embodiments of the present disclosure, determining, by the flow control unit, that the amount of the data in the buffer of the PMA layer is insufficient comprises:

setting a data amount threshold of the buffer according to an outgoing transmission rate of the verification system, selection of the PMA clock, and a time interval between the flow control unit sending the request to the RS and the PMA layer receiving the data; and determining that the amount of the data in the buffer of the PMA layer is insufficient in a case of detecting that the amount of the data in the buffer is less than the data amount threshold.

As a further improvement of some embodiments of the present disclosure, the PCS comprises multiple pcs lanes, each pcs lane being provided with a FIFO, wherein data in each pcs lane is split into separate bits which are sent to corresponding FIFOs, and the FIFOs send the separate bits to the PMA layer, and the PMA layer sends, by means of a serdes, the data to the Ethernet interface chip to be tested.

As a further improvement of some embodiments of the present disclosure, the method further comprises:

before sending the data in each pcs lane to the corresponding FIFOs, first sending random data bits of different numbers to different FIFOs to produce misalignment of the transmitted data between the pcs lanes.

As a further improvement of some embodiments of the present disclosure, the method further comprises:

generating, according to the number of the pcs lanes, a corresponding number of mutually different random numbers, and randomly allocating the random numbers to respective pcs lanes; and ranking all the pcs lanes according to the allocated random numbers to produce disorder of the pcs lanes.

As a further improvement of some embodiments of the present disclosure, the method further comprises:

acquiring, by the PMA layer, a bit width of a serdes connected to the PMA layer; and splicing, by the PMA layer according to the bit width, the data in the buffer into a data block having the same bit width as the serdes, and sending, by the PMA layer, the data block to the serdes.

Compared with the related art, in the verification system for the Ethernet interface chip of some embodiments of the present disclosure, a clock is merely provided in the PMA layer, no clock is provided in the RS, and data transfer in the RS is controlled by the flow control unit, so that the amount of data requiring to be buffered in the PMA layer can be controlled within a certain range, and thus does not increase indefinitely over time, thereby facilitating a better verification for an Ethernet interface chip. In addition, the verification method for the Ethernet interface chip of some embodiments of the present disclosure can produce misalignment of the data transmitted between the pcs lanes and disorder of the pcs lanes, so as to verify a fault tolerance function of the Ethernet interface chip. Moreover, by using the verification method, serdes of different bit widths can be flexibly supported.

DETAILED DESCRIPTION OF THE EMBODIMENTS

Hereinafter, some embodiments of the present disclosure will be described in detail with reference to the exemplary embodiments shown in the accompanying drawings. However, these embodiments do not limit the present disclosure, and structures, methods, or functional changes made by a person having ordinary skill in the art according to these embodiments are comprised in the scope of protection of the embodiments of the present disclosure.

Figure 1:
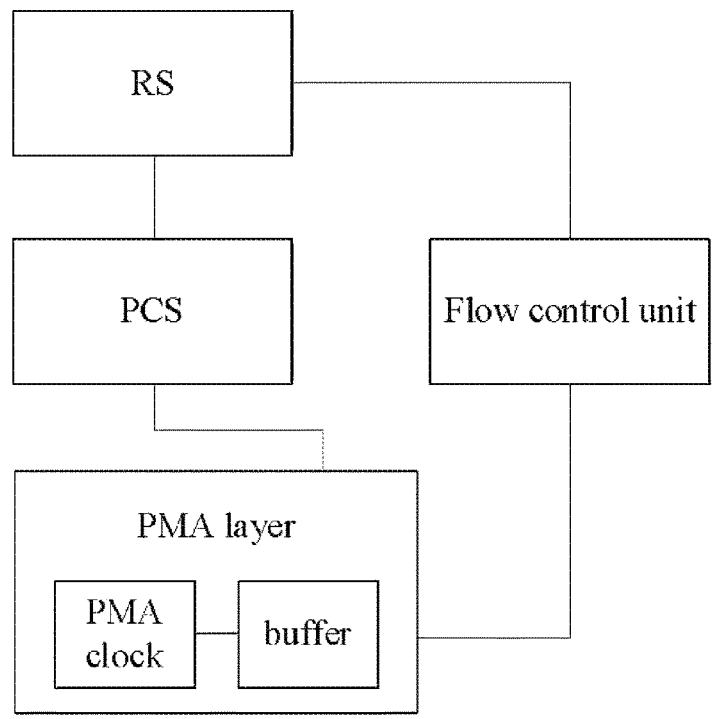
FIG. 1 is a schematic diagram of modules of a verification system for an Ethernet interface chip according to some embodiments of the present disclosure.

As shown in FIG. 1, some embodiments of the present disclosure provide a verification system for an Ethernet interface chip. The verification system comprises an RS, a PCS, a PMA layer, and a flow control unit connecting the RS and the PMA layer. The RS is configured to receive external data, and the external data is transferred from the RS to the PCS in sequence, and then transferred to the PMA layer, and finally the PMA layer sends, by means of a serdes, the data to an Ethernet interface chip to be tested.

The PMA layer is provided with a PMA clock and a buffer, wherein the buffer is configured to store data transferred from the PCS, and the PMA clock is configured to control the PMA layer to send the data in the buffer to the Ethernet interface chip to be tested. As an exemplary implementation, when the clock signal of the PMA clock is at a rising edge or a falling edge, the buffer is triggered to send data.

The flow control unit is configured to control sending of data in the RS based on determination concerning whether an amount of the data in the buffer is sufficient. As an exemplary implementation, when determining that the amount of the data in the buffer is insufficient, the flow control unit is configured to send a request to the RS; and after receiving the request from the flow control unit, the RS is configured to send data to the PCS.

It should be noted that the amount of data in the buffer being insufficient means that the amount of data in the buffer is less than a data amount threshold. The data amount threshold is a reasonable data amount which ensures that at any time, the amount of data in the buffer is greater than the amount of data sent to the serdes each time. The reasonable data amount is suggested to be a minimum data amount, so that the memory required by the buffer is the minimum.

The setting of the data amount threshold is related to two factors: (1) an outgoing transmission rate (the outgoing transmission rate may be preset or negotiated in advance) of the verification system and the selection of the clock; and (2) a time interval between the flow control unit sending the request to the RS and the PMA layer receiving the data. It is assumed that the amount of data sent to the serdes in each clock period is determined to be N according to the factor (1), and the time interval of the factor (2) is M (rounding up to an integer in units of clock period, that is, if the clock interval is 1.3 clock periods, M is 2), and then the data amount threshold is greater than or equal to N*M.

It should be noted that the flow control unit may detect the buffer every clock period (the PMA clock), or may detect the buffer every R clock periods (R is a positive integer greater than 1), the shorter the interval of the detection performed by the flow control unit, the smaller the required memory of the buffer, and similarly, the longer the interval of the detection performed by the flow control unit, the larger the required memory of the buffer.

In the verification system of some embodiments of the present disclosure, a clock is merely provided in the PMA layer, no clock is provided in the RS, and data transfer in the RS is controlled by the flow control unit, so that the amount of data requiring to be buffered in the PMA layer can be controlled within a certain range, and thus does not increase indefinitely over time, thereby facilitating a better verification for an Ethernet interface chip.

In some exemplary embodiments, the PCS comprises multiple pcs lanes, each pcs lane being provided with a FIFO, wherein data in each pcs lane is split into separate bits which are sent to corresponding FIFOs, and the FIFOs send the separate bits to the PMA layer.

Figure 2:
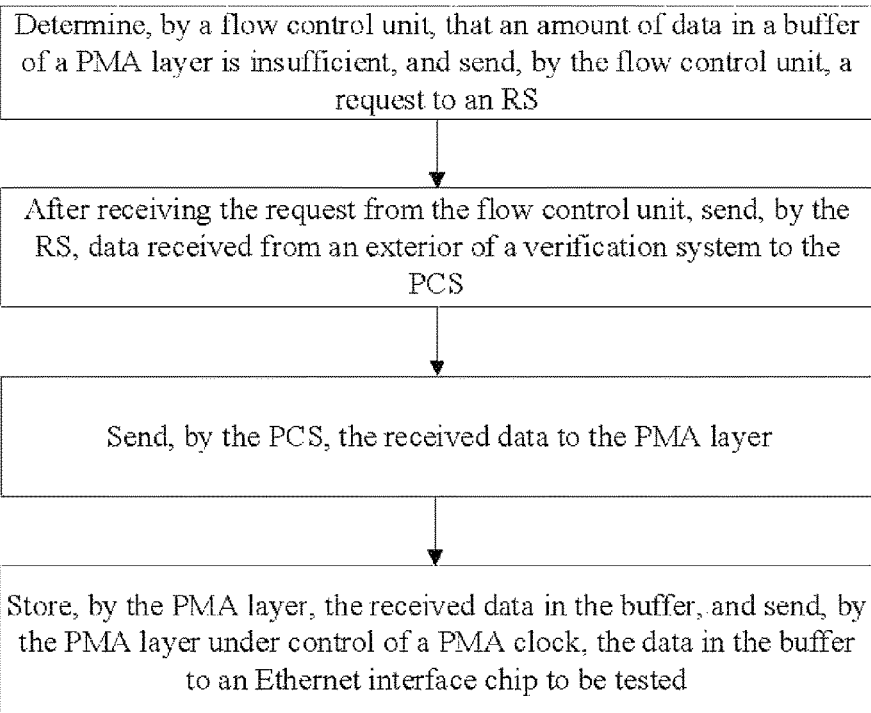
FIG. 2 is a schematic flow diagram of a verification method for an Ethernet interface chip according to some embodiments of the present disclosure.

As shown in FIG. 2, some embodiments of the present disclosure provide a verification method for an Ethernet interface chip, wherein the method verifies the Ethernet interface chip by using the verification system above, and the method comprises operations which are described in detail below.

At operation S100, the flow control unit determines that an amount of data in the buffer of the PMA layer is insufficient, and sends a request to the RS.

It is determined that the amount of the data in the buffer of the PMA layer is insufficient when the flow control unit detects that the amount of the data in the buffer is less than a data amount threshold. Under such conditions, a data issuing request is sent to the RS. The setting of the data amount threshold has been explained above, and will not be described herein again.

At operation S200, after receiving the request from the flow control unit, the RS sends data received from an exterior of the verification system to the PCS.

The RS no longer sends data to a lower layer (the PCS) according to a clock signal, but sends data to the lower layer only when the request of the RS is received.

At operation S300, the PCS sends the received data to the PMA layer.

The PCS comprises multiple pcs lanes, each pcs lane being provided with a FIFO, wherein data in each pcs lane is split into separate bits which are sent to corresponding FIFOs, and the FIFOs send the separate bits to the PMA layer.

At operation S400, the PMA layer stores the received data in the buffer, and sends, under control of the PMA clock, the data in the buffer to the Ethernet interface chip to be tested.

In the verification system, a clock is merely provided in the PMA layer, no clock is provided in the RS, and data transfer in the RS is controlled by the flow control unit, so that the amount of data requiring to be buffered in the PMA layer can be controlled within a certain range, and thus the size of the buffer can be selected according to the amount of data requiring to be buffered. The PMA clock controls sending of data in the buffer. As an exemplary implementation, when the clock signal of the PMA clock is at a rising edge or a falling edge, the buffer is triggered to send data.

The PMA needs to send the data in the buffer to the serdes, and then the serdes sends the data to the Ethernet interface chip to be tested.

In some exemplary embodiments, before sending the data in each pcs lane to the corresponding FIFOs, random data bits of different numbers are first sent to different FIFOs to produce misalignment of the transmitted data between the pcs lanes. For example, assuming that there are four pcs lanes, 1, 5, 3 and 7 random bits are respectively sent to corresponding FIFOs, and after the data in the pcs lanes is sent to the corresponding FIFOs, the data of the pcs lanes in the FIFOs is not in an aligned state but is misaligned. By producing such misaligned data, the fault tolerance function of the Ethernet interface chip can be tested.

In some other exemplary embodiments, by producing disorder pcs lanes, the fault tolerance function of the Ethernet interface chip can also be tested. As an exemplary implementation, a corresponding number of mutually different random numbers are generated according to the number of the pcs lanes, and are randomly allocated to respective pcs lanes; and all the pcs lanes are ranked according to the allocated random numbers. For example, there are four pcs lanes, lane1, lane2, lane3 and lane4, and four mutually different random numbers 9, 6, 5 and 8 are generated, and are sequentially allocated to the pcs lanes, and then the pcs lanes are ranked according to the random numbers, so as to obtain a new ranking: lane3, lane2, lane4 and lane1.

In some exemplary embodiments, the PMA layer first acquires a bit width of a serdes connected to the PMA layer, and then according to the bit width, the data in the buffer is spliced into a data block having the same bit width as the serdes, and the data block is sent to the serdes. In this way, serdes of different bit widths can be flexibly supported.

It should be understood that although the present description is illustrated according to the embodiments, not every embodiment comprises only one independent technical solution, the illustration manner of the description is merely for clarity, and a person having ordinary skill in the art should take the description as a whole, and the technical solutions in various embodiments can be combined properly to derive other embodiments that could be understood by a person having ordinary skill in the art.

The series of detailed illustrations listed above are merely specific illustrations of feasible embodiments of the present disclosure, and they are not intended to limit the scope of protection of the embodiments of the present disclosure, and equivalent embodiments or modifications made without departing from the principle of the embodiments of the present disclosure should be comprised within the scope of protection of the embodiments of the present disclosure.

What is claimed is:

1. A verification system for an Ethernet interface chip, wherein the verification system comprises a Reconciliation Sublayer (RS), a Physical Coding Sublayer (PCS), a Physical Medium Attachment (PMA) layer, and a flow control unit connecting the RS and the PMA layer, wherein
   the PMA layer is provided with a PMA clock and a buffer, wherein the buffer is configured to store data transferred from the PCS, and the PMA clock is configured to control the PMA layer to send the data in the buffer to an Ethernet interface chip to be tested;
   the flow control unit is configured to control sending of data in the RS based on determination concerning whether an amount of the data in the buffer is sufficient;
   the RS is configured to send data to the PCS under control of the flow control unit; and
   the PCS is configured to send the data sent by the RS to the PMA layer.

2. The verification system for the Ethernet interface chip according to claim 1, wherein
   the flow control unit is further configured to send a request to the RS in a case of determining that the amount of the data in the buffer is insufficient; and
   the RS is further configured to send data to the PCS after receiving the request from the flow control unit.

3. The verification system for the Ethernet interface chip according to claim 2, wherein the flow control unit is further configured to:
   set a data amount threshold of the buffer according to an outgoing transmission rate of the verification system, selection of the PMA clock, and a time interval between the flow control unit sending the request to the RS and the PMA layer receiving the data; and
   determine that the amount of the data in the buffer of the PMA layer is insufficient in a case of detecting that the amount of the data in the buffer is less than the data amount threshold.

4. The verification system for the Ethernet interface chip according to claim 3, wherein in a case where an amount of data sent to a serdes in each clock period is determined to be N according to the outgoing transmission rate of the verification system, and the time interval between the flow control unit sending the request to the RS and the PMA layer receiving the data is M, then the flow control unit is configured to set the data amount threshold of the buffer to be greater than or equal to N*M.

5. The verification system for the Ethernet interface chip according to claim 4, wherein M is rounded up to an integer in units of clock period.

6. The verification system for the Ethernet interface chip according to claim 1, wherein
the PCS comprises multiple pcs lanes, each pcs lane being provided with a FIFO, wherein data in each pcs lane is split into separate bits which are sent to corresponding FIFOs, and the FIFOs send the separate bits to the PMA layer.

7. The verification system for the Ethernet interface chip according to claim 6, wherein the PCS is further configured to, before sending the data in each pcs lane to the corresponding FIFOs, first send random data bits of different numbers to different FIFOs to produce misalignment of the transmitted data between the pcs lanes.

8. The verification system for the Ethernet interface chip according to claim 6, wherein the PCS is further configured to:
generate, according to the number of the pcs lanes, a corresponding number of mutually different random numbers, and randomly allocate the random numbers to respective pcs lanes; and
rank all the pcs lanes according to the allocated random numbers to produce disorder of the pcs lanes.

9. The verification system for the Ethernet interface chip according to claim 6, wherein
the PMA layer is configured to acquire a bit width of a serdes connected to the PMA layer; and
the PMA layer is configured to splice, according to the bit width, the data in the buffer into a data block having the same bit width as the serdes, and send the data block to the serdes.

10. The verification system for the Ethernet interface chip according to claim 1, wherein the PMA layer is configured to send, via a serdes, the data in the buffer to the Ethernet interface chip to be tested.

11. The verification system for the Ethernet interface chip according to claim 1, wherein the PMA layer is configured to trigger, when a clock signal of the PMA clock is at a rising edge or a falling edge, the butter to send the data in the buffer to the Ethernet interface chip to be tested.

12. A verification method for an Ethernet interface chip, wherein the method verifies the Ethernet interface chip by using the verification system according to claim 1, and the method comprises:
determining, by the flow control unit, that an amount of data in the buffer of the PMA layer is insufficient, and sending, by the flow control unit, a request to the RS;
after receiving the request from the flow control unit, sending, by the RS, data received from an exterior of the verification system to the PCS;
sending, by the PCS, the received data to the PMA layer; and
storing, by the PMA layer, the received data in the buffer, and sending, by the PMA layer under control of the PMA clock, the data in the buffer to the Ethernet interface chip to be tested.

13. The verification method for the Ethernet interface chip according to claim 12, wherein determining, by the flow control unit, that the amount of the data in the buffer of the PMA layer is insufficient comprises:
setting a data amount threshold of the buffer according to an outgoing transmission rate of the verification system, selection of the PMA clock, and a time interval between the flow control unit sending the request to the RS and the PMA layer receiving the data; and
determining that the amount of the data in the buffer of the PMA layer is insufficient in a case of detecting that the amount of the data in the buffer is less than the data amount threshold.

14. The verification method for the Ethernet interface chip according to claim 13, wherein setting the data amount threshold of the buffer according to the outgoing transmission rate of the verification system, selection of the PMA clock, and the time interval between the flow control unit sending the request to the RS and the PMA layer receiving the data comprises:
in a case where an amount of data sent to a serdes in each clock period is determined to be N according to the outgoing transmission rate of the verification system, and the time interval between the flow control unit sending the request to the RS and the PMA layer receiving the data is M, then setting the data amount threshold of the buffer to be greater than or equal to N*M.

15. The verification method for the Ethernet interface chip according to claim 12, wherein
the PCS comprises multiple pcs lanes, each pcs lane being provided with a FIFO, wherein data in each pcs lane is split into separate bits which are sent to corresponding FIFOs, and the FIFOs send the separate bits to the PMA layer, and the PMA layer sends, by means of a serdes, the data to the Ethernet interface chip to be tested.

16. The verification method for the Ethernet interface chip according to claim 15, wherein the method further comprises:
before sending the data in each pcs lane to the corresponding FIFOs, first sending random data bits of different numbers to different FIFOs to produce misalignment of the transmitted data between the pcs lanes.

17. The verification method for the Ethernet interface chip according to claim 15, wherein the method further comprises:
generating, according to the number of the pcs lanes, a corresponding number of mutually different random numbers, and randomly allocating the random numbers to respective pcs lanes; and
ranking all the pcs lanes according to the allocated random numbers to produce disorder of the pcs lanes.

18. The verification method for the Ethernet interface chip according to claim 15, wherein the method further comprises:
acquiring, by the PMA layer, a bit width of a serdes connected to the PMA layer; and
splicing, by the PMA layer according to the bit width, the data in the buffer into a data block having the same bit width as the serdes, and sending, by the PMA layer, the data block to the serdes.

19. The verification method for the Ethernet interface chip according to claim 12, wherein sending, by the PMA layer under control of the PMA clock, the data in the buffer to the Ethernet interface chip to be tested comprises:
sending, by the PMA layer via a serdes under the control of the PMA clock, the data in the buffer to the Ethernet interface chip to be tested.

20. The verification method for the Ethernet interface chip according to claim 12, wherein sending, by the PMA layer under control of the PMA clock, the data in the buffer to the Ethernet interface chip to be tested comprises:
  triggering, by the PMA layer when a clock signal of the PMA clock is at a rising edge or a falling edge, the butter to send the data in the buffer to the Ethernet interface chip to be tested.

* * * * *